Nov. 3, 1970  F. O. BLACKWELL III, ETAL  3,537,327
ANGULARLY ADJUSTABLE TORQUE AMPLIFIER
Filed Feb. 4, 1969

INVENTORS
RUSSELL M. WHEELER
FRANCIS O. BLACKWELL III
ROBERT H. EISENGREIN

BY
Christel & Bean
ATTORNEYS

United States Patent Office 3,537,327
Patented Nov. 3, 1970

3,537,327
ANGULARLY ADJUSTABLE TORQUE AMPLIFIER
Francis O. Blackwell III, and Russell M. Wheeler, Seneca Falls, and Robert H. Eisengrein, Skaneateles, N.Y., assignors to SFM Corporation, Union, N.J.
Filed Feb. 4, 1969, Ser. No. 796,385
Int. Cl. F16h 5/06, 3/08
U.S. Cl. 74—335                                10 Claims

ABSTRACT OF THE DISCLOSURE

A torque amplifier having a drum and a band engageable with the drum. A power transmission gear is operatively connected to an output shaft, and a band adjusting member connected to the band is rotatable with the power transmission gear. A jackscrew carried by the band adjusting member engages the gear in a manner to selectively adjust the relative angular position thereof, thereby varying the clearance between the band and drum. The member is secured in adjusted position by a locking screw accessible, along with the jackscrew through an access opening with the amplifier housing.

BACKGROUND OF THE INVENTION

Drive systems requiring a relatively large power input can be controlled with a relatively small force by using mechanical power amplifiers, often called torque amplifiers. Such amplifiers selectively transmit a relatively large power force from an input shaft, which can be continuously rotated in one direction, to an output shaft to rotate the latter in either direction, all under the control of a relatively small force.

The transmission customarily include one or more drums and friction bands operable when engaged to couple the output and input shafts for driving the former from the latter. Such bands wear in use, and it becomes necessary from time to time to adjust the normal clearance between the band and its associated drum. It is desirable to effect such adjustment quickly and easily without having to dismantle the amplifier.

SUMMARY OF THE INVENTION

Accordingly, a primary object of this invention is to provide a torque amplifier having means for adjusting the friction bands relative to their drums from externally of the amplifier housing, in a manner facilitating such adjustment and reducing to a minimum the effort involved.

Another object of this invention is to accomplish the foregoing with a relatively simple and inexpensive construction which is durable and dependable in operation.

The band adjusting arrangement of our invention is characterized by the provision of a band adjusting member to which the band is connected and which is mounted for rotation with a power transmission gear. The band adjusting member also is rotatable relative to the gear and an adjustable jackscrew arrangement is provided for relatively, angularly positioning the ring and gear. A lock screw arrangement is provided for clamping the member in adjusted position, both the jackscrew and the locking screw being accessible from externally of the amplifier housing through access openings in the side wall thereof.

BRIEF DESCRIPTION OF THE DRAWING FIGURES

Figure 1:
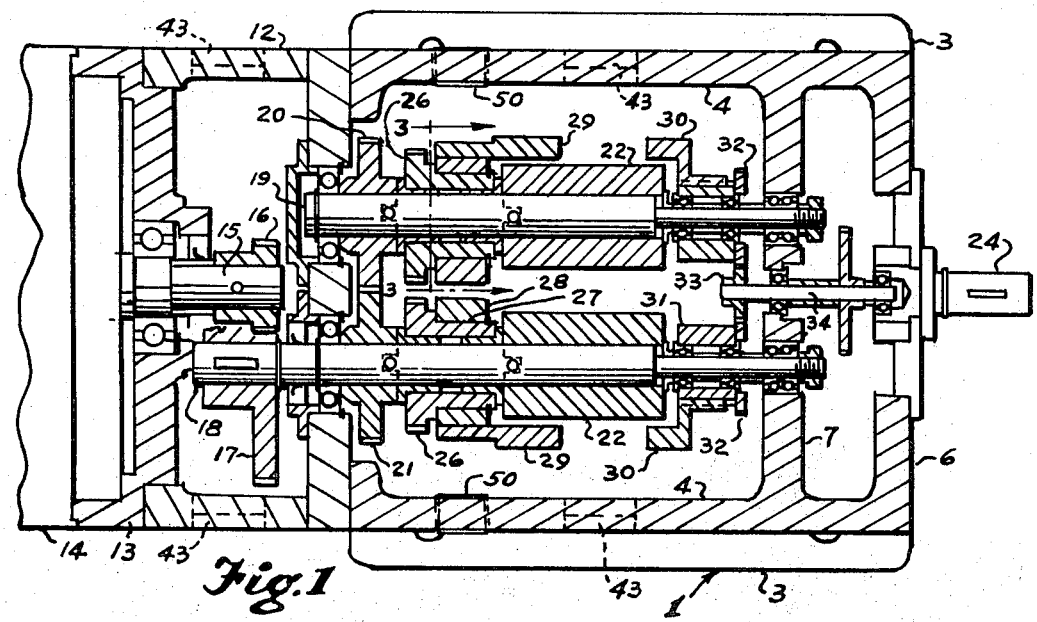
FIG. 1 is a horizontal sectional view of a torque amplifier of this invention taken about on line 1—1 of FIG. 2, the band input and output arms being shown in one angular position and the drive motor being broken away for convenience in illustration.
Figure 2:
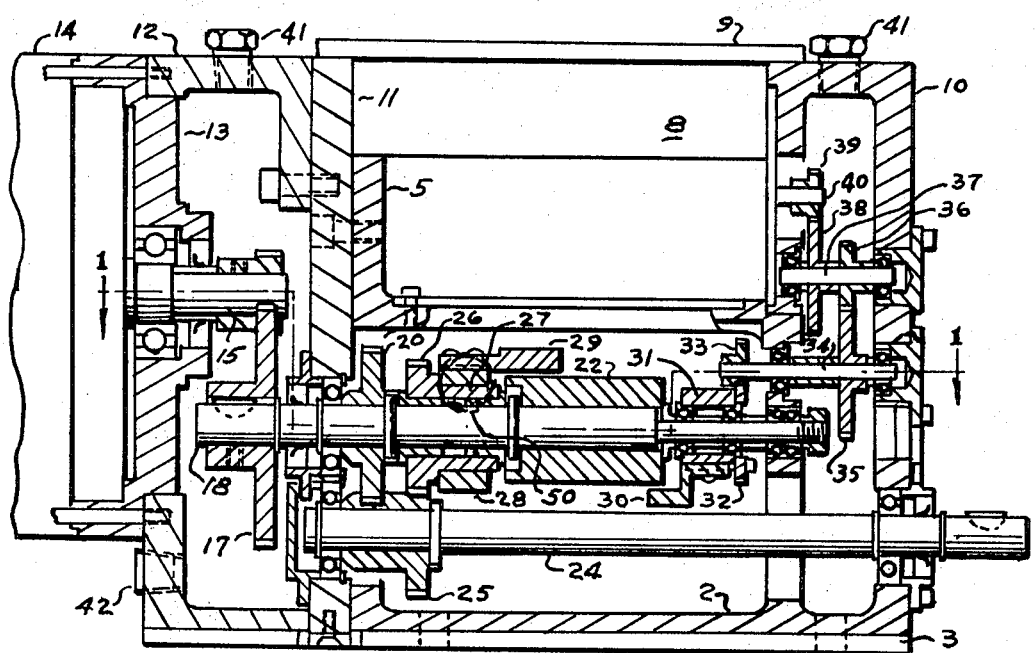
FIG. 2 is a vertical sectional view thereof, the band arms being shown in another angular position.
Figure 3:
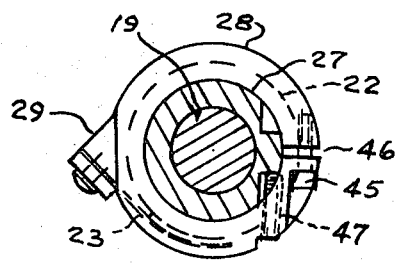
FIG. 3 is a fragmentary detail view of the band adjusting mechanism, on an enlarged scale, being taken about on line 3—3 of FIG. 1.

The drum engaging bands shown in FIG. 3 are omitted from FIGS. 1 and 2 for greater clarity and ease in illustration.

DETAILED DESCRIPTION OF THE DETAILED EMBODIMENT

Referring now in detail to the illustrative embodiment depicted in the accompanying drawings, there is shown a torque amplifier of this invention enclosed within a housing 1 comprising a cast housing having a bottom wall 2 with supporting feet 3 along opposite sides thereof, side walls 4, opposite end walls 5 and 6 and an intermediate end wall 7, the end walls having openings therethrough for various shafts and shaft mountings as will become apparent. The upper portion of housing 1 is open, defining a chamber 8 for a control motor, the chamber being accessible through a removable cover 9. A control housing 10 is positioned over end walls 6, 7 and an end plate 11 is secured to end wall 5. A gear case 12 is secured against end plate 11 and the end bell 13 of a drive motor 14 is secured against the outer side of gear case 12.

The drive motor output shaft 15 is journaled in end bell 13 and carries a drive gear 16 in driving engagement with another drive gear 17 carried by a drum shaft 18 journaled in end plate 11 and end wall 7. Another drum shaft 19 is similarly journaled, and carries a drive gear 20 engaging a drive gear 21 on the first drum shaft 18 whereby drum shafts 18 and 19 are rotated in opposite directions by drive shaft 15.

Shafts 18 and 19 each carry a drum 22 and each drum is encircled by a friction band 23 (FIG. 3), each band being arranged for selective engagement with its associated drum to transmit power from the engaged drum shaft to an output shaft 24 journaled in end plate 11 and end wall 6 and projecting therebeyond.

Output shaft 24 carries a gear 25 which engages a pair of output gears 26 one of which is journaled on drum shaft 18 and the other of which is journaled on drum shaft 19. Each output gear 26 has an axially elongated hub extension 27 of reduced diameter carrying a band adjusting member 28 releasably clamped thereto and having an output arm 29 to which one end of the friction band 23 is secured, as will be described. The opposite end of the friction bands 23 are connected to input band arms 30 secured to members 31, one of which is journaled on shaft 18 and the other on shaft 19. Each member 31 carries a gear 32 engaging a control input gear 33 carried by a shaft 34 journaled between end walls 6 and 7. Shaft 34 carries another gear 35 engaging a gear 36 mounted on another shaft 37 journaled in the control housing, the shaft 37 carrying another gear 38 engaging a gear 39 on the control motor output shaft 40.

With the illustrated arrangement, drums 22 are continually rotated in opposite directions by the continually rotating, uni-directional drive shaft 15. Rotation of the control motor output shaft 40 in either direction will rotate one of the input band arms 30 in a direction tightening the attached band 23 about its associated drum 22 to engage the same while rotating the other input band arm 30 in a direction loosening its band. Engagement of either band with its drum will cause drive power to be transmitted in one direction or the other to the output shaft. In this way, drive power can be transmitted from the uni-directional drive shaft 15 to the bi-directional output shaft 24 for an interval determined by the rotational movement of control motor shaft 40, as will be understood by those skilled in the art.

Breather vents 41 are provided, through which oil can be added to the housings, and drains can be provided at the lower end of the housings, as indicated for example at 42. Sight glasses 43 are provided at selected locations, to visually determine the oil level with the housings.

The control input arrangement provides for changing the gear ratios in two locations, between gears 35 and 36, and between gears 38 and 39, thereby permitting selective variation in the gearing from the control motor output shaft 40 to the control input shaft 34 by replacing these gears with others of a different ratio.

It becomes necessary from time to time to adjust the normal clearance between the friction bands 23 and their associated drums 22, not only initially but also after use as the bands wear. It is a particular feature of our invention that this is readily accomplished from externally of the housing, in a simple and expeditious manner and without requiring dismantling or disassembly of the unit.

To this end, the band adjusting members 28 are formed as split rings, adapted to clamp about gear hubs 27. Each ring 28 has a lock screw 45 extending through an opening in the ring on one side of the gap 46 and threadedly engaging a tapped opening in the ring on the opposite side of gap 46. The ring is notched, to accommodate the lock screw head as shown in FIG. 3. Thus, screw 45 will draw together the ends of the split ring 28 to clamp it securely around hub 27. On the other hand, loosening screw 45 will permit the ring 28 to rotate on hub 27.

A jack screw 47 extends through a threaded opening in each ring 28, into engagement with a stop shoulder 48 formed by notching out the associated hub 27. With lock screw 45 loosened, rotation of jack screw 47 in one direction will cause ring 28 to rotate relative to hub 27 in a direction reducing the clearance between band 23 and the associated drum. Rotation of jack screw 47 in the other direction will permit ring 28 to be rotated in the opposite direction, relative to hub 27, to increase the clearance between the band and its drum. Tightening lock screw 45 locks ring member 28 in adjusted position.

Lock screws 45 and jack screws 47 extend cordwise of the respective clamp rings 28 and hubs 27, for being actuated from the side. Access openings, closed by removable plugs 50 are provided in side walls 4 of the amplifier housing, at an elevation above the drum shaft axes and in line with screws 45, 47 when the latter are positioned in their vertically uppermost position. In other words, by simply removing plugs 50 and rotating the shafts to position the adjusting screws upper most thereon, an appropriate wrench, screwdriver or other tool can be inserted through the access openings into engagement first with lock screws 45 and then with jack screws 47 to selectively adjust the relative angular position of the output gears 26 and their associated band arm adjusting rings. It is not necessary to disassemble the amplifier, and the desired adjustments can be made quickly and easily, on the job.

The bands 23 are clamped to their associated arms 29, 30 by screws or other suitable fastening means.

Accordingly, it is seen that our invention fully accomplishes its intended objects. While only one embodiment has been disclosed and described in detail herein, that has been done by way of illustration only, without thought of limitation. While two drums are shown, the band adjusting arrangement of this invention is usable with an amplifier having only one drum. In the illustrated arrangement the bands are oppositely wound about their associated drums, to loosen one band while the other is tightened by the control motor, and the jackscrew adjustment is arranged so that extending either jackscrew tightens the connected band relative to its drum. Locating the access openings above the drum shaft axes permits adjusting of the bands without disturbing the oil level.

We claim:

1. A torque amplifier comprising a drum shaft and means for rotating the same about its axis, a drum mounted on said shaft for rotation therewith, an output shaft, transmission gear means operatively connected to said output shaft for rotating the same, a band engageable with said drum, a band adjusting member connected to said band and mounted for rotation with said gear means, for engaging said band with said drum and thereby rotating said output shaft, said member being angularly adjustable relative to said gear means thereby to vary the clearance between said band and said drum, adjusting screw means extending between said member and said gear means for angularly relatively positioning the same, and means for releasably securing said gear means and said member in adjusted position.

2. A torque amplifier as set forth in claim 1, wherein said adjusting screw means comprises jackscrew means operable when extended to relatively adjust said member and gear means in a direction tightening said band relative to said drum.

3. A torque amplifier as set forth in claim 2, wherein said gear means includes a hub and said member comprises a split ring carried by said hub, said securing means comprising locking screw means operable to clamp said member to said hub.

4. A torque amplifier as set forth in claim 3, wherein said jackscrew means is carried by said member, said hub having a shoulder engaged by said jackscrew means.

5. A torque amplifier as set forth in claim 4, wherein both said locking screw means and said jackscrew means extend chordwise of said member for adjustment of said respective screw means from the same side of said member.

6. A torque amplifier as set forth in claim 5, said torque amplifier including an enclosing housing having a side wall, means defining an opening through said housing side wall for access to said jackscrew and locking screw means, and a removable closure for said opening.

7. A torque amplifier as set forth in claim 1, said torque amplifier including an enclosing housing having a wall, means providing an opening through said housing wall for access to said adjusting screw means and said releasable securing means, and a removable closure for said opening.

8. A torque amplifier as set forth in claim 1, wherein two of said drums are provided together with two of said bands, and wherein there is a separate band adjusting member for each of said bands.

9. A torque amplifier comprising a housing, a drum shaft journaled for rotation about its axis and a drum mounted on said shaft for rotation therewith in said housing, an output shaft, transmission gear means within said housing operatively connected to said output shaft for rotating the same, a band engageable with said drum, a band adjusting member within said housing connected to said band and mounted for rotation with said gear means, control means for engaging said band with said drum and thereby rotating said output shaft, said member being angularly adjustable relative to said gear means thereby to vary the clearance between said band and said drum, adjusting means carried by one of said member and gear means for engagement with the other thereof to adjust the relative angular position thereof, and locking means also carried by one of said member and gear means for releasably securing the same in adjusted position, said housing having an enclosing wall provided with an opening therethrough for access to said internal adjusting and locking means from externally of said housing.

10. A torque amplifier as set forth in claim 9, said housing being adapted to contain oil to the level of said axis, and said access opening being above said level.

References Cited
UNITED STATES PATENTS

| | | | |
|---|---|---|---|
| 1,113,704 | 10/1914 | So Relle | 74—329 X |
| 2,722,846 | 11/1955 | McDonald | 74—355 |

ARTHUR T. McKEON, Primary Examiner

U.S. Cl. X.R.

74—329